Patented Apr. 16, 1946

2,398,735

UNITED STATES PATENT OFFICE 2,398,735

MELTABLE ADHESIVE SEALING AND REINFORCING TAPE

Lewis Davis and Edwin C. Tuukkanen, Worcester, Mass., assignors to McLaurin-Jones Co., Brookfield, Mass., a corporation of Massachusetts No Drawing. Application August 21, 1942, Serial No. 455,626

3 Claims. (Cl. 117—122)

This invention relates to adhesively coated tapes of the general character used in sealing and reinforcing cartons. It is more especially concerned with tapes of this type which carry a meltable waterproof adhesive and are designed to be applied by the so-called "hot sealing" process.

While tapes of this general character were proposed long ago, they have gone into use to only a very limited extent, notwithstanding the fact that cartons sealed with tapes carrying water-soluble adhesives are used very widely, and the further fact that the latter tapes are not suited to the requirements of ocean shipment and under conditions where the packages will be exposed to very humid atmospheric conditions. The reasons for this situation reside partly in the higher cost of the tapes coated with meltable adhesive, but more especially in the fact that machines for applying tapes of this kind are relatively scarce and require more attention than do the common sealing machines, and the further fact that the tapes themselves frequently have not been altogether satisfactory. This last mentioned difficulty is chiefly occasioned by the fact that for most practical purposes asphalt forms the most suitable base for the adhesive coating of a tape of this character, and it has inherent characteristics which introduce serious problems of control, as well as producing results which are undesirable in the final product. While this material is available in a wide variety of grades having different melting points, those suitable for use in a tape of the meltable adhesive type must have a relatively low melting point or softening range, say below 200° F., and these all have the characteristic of presenting a tacky or sticky surface at high atmospheric temperatures. In addition, asphalts of this character do not have the desired degree of adhesive strength, so that it is necessary for most purposes to reinforce the adhesive properties of the asphalt in some way.

To devise an adhesive tape and an adhesive coating composition suitable for use on such a tape which will have the desired melting range, waterproofing characteristics, and adhesive strength, while, at the same time being sufficiently dry and non-tacky at high atmospheric temperatures and humidities as to be capable of easy handling in applying machines and during the processes of manufacture of the tapes themselves and of the cartons on which they are to be used, constitutes the chief object of the present invention.

We have found that a very satisfactory adhesive for this purpose can be made by mixing an asphalt of the low melting point type with a thermoplastic material of a resinous nature having good adhesive properties and a melting point considerably higher than that of the asphalt. Any attempt to apply asphalt in a melted condition to the surface of paper, or any other suitable backing material for the sealings tape, is so expensive and gives so much trouble that we prefer to dissolve the asphalt in a solvent. Also, in order to simplify the process and to reduce the expense of manufacture, the resinous modifier or other substance to be blended with the asphalt should preferably be soluble in the same solvent, or at least in one miscible with that used to dissolve the asphalt.

These conditions, we find, as well as those above referred to, can be met by using an asphalt having a melting point or softening range running from, say, 160° F. to 200° F., dissolving it in toluol or benzol, and using Pliolite as a modifier. This latter substance is available commercially in both milled and unmilled forms and is a product of the Goodyear Tire and Rubber Company. It is a rubber condensation derivative produced by the polymerization and cyclization of rubber in the presence of proper catalysts. More specifically, it is a reaction product of rubber and a halogen acid of tin, as for example, hydrated chlorostannous acid ($HSnCl_3.3H_2O$) or hydrated chlorostannic acid ($H_2SnCl_6.2H_2O$), and is disclosed more fully in United States Patent No. 1,797,188.

A typical formula is as follows:

| | Parts |
|---|---|
| Asphalt | 14 to 19 |
| Pliolite (unmilled) | 6 to 1 |
| Toluol | 15 |

(All parts are by weight.)

Because the Pliolite is more expensive than the asphalt, it is preferable to use as little of it as necessary to produce the desired results, and a compound consisting of 19 parts of asphalt with 1 of Pliolite dispersed in 15 parts of toluol or benzol forms a good adhesive for use in coating paper or any of the common backing materials from which sealing and reinforcing tapes are customarily made. Naturally the proportion of solvent used will be adjusted to the requirements of the coating operation. Or, in other words, to make an adhesive mixture that will run well in the coating machine, will not penetrate substantially into the backing sheet, and will satisfy the necessary operating conditions for successful manufacture.

Such a mixture as that above mentioned coats well on backing tape at room temperatures. This operation may be performed in the usual coating machinery, the backing paper being unwound from a supply roll, fed through the coating apparatus, then through a drying chamber or over a drying drum, and finally re-wound into a roll. The coating machine may be equipped with a slitting attachment which will split the web into tapes of the desired width, or this slitting operation may be performed as an independent step.

Because both the Pliolite and the asphalt are meltable into a free flowing liquid at temperatures well below those at which the backing sheet or the carton stock to which the tape is to be applied would be injured, this product can be run efficiently in tape applying machines such as those shown, for example, in the McLaurin Patent No. 1,969,660, granted August 7, 1934. In this case, however, the initial adhesion of the tape to the carton or other article of work should be produced either by holding the tape against the work mechanically until after it has passed under the hot sealing plates, or else by applying toluol or benzol to the surface of the tape as it passes from the supply roll to the carton, thus developing the adhesive properties of the coating by the time the tape makes contact with the carton. The machine shown in the patent just mentioned is equipped with apparatus for applying such a solvent.

A more flexible product can be produced by using a plasticizer, such as Hercolyn, in the formula above presented in proportions of, say, 1.9 parts to 4.7 parts. This is a liquid methyl ester of rosin entirely compatible with both the Pliolite and the asphalt. Numerous substitutes for this particular plasticizer are, however, available.

If the milled type of Pliolite resin is substituted for the unmilled variety, then the proportion of it should be substantially doubled. This form of Pliolite, however, has the advantage of being soluble in a much wider variety of solvents than does the unmilled form. When it is used the toluol, benzol, or other forms of aromatic hydrocarbons required to dissolve the unmilled Pliolite may be replaced by any of the petroleum hydrocarbons, such as naphtha, and the like, or those above mentioned may be used.

The types of Pliolite commercially available are understood to be about 50% converted.

The Pliolite and asphalt when blended in such proportions as those above described and coated on the backing, produce a dry, hard, non-tacky film which will retain these characteristics up to about 150° F. The viscosity of these solutions can readily be so adjusted that no serious penetration of the mixture into the backing sheet will occur. When such a tape is heat-sealed to a carton it is bonded thereto with an exceptionally high degree of adhesion, and that union is not materially affected by water nor by atmospheric moisture. Also, when the adhesive coating is re-wet with toluol or benzol its tacky properties are promptly developed and it then dries out hard again immediately upon the evaporation of the solvent.

The backing material may consist of a strong paper, such as kraft stock, or fabric, or any other suitable sheet material. An exceptionally satisfactory article is produced by using a backing comprising two webs of kraft paper bonded together by an intermediate film of asphalt, with reinforcing fibers of some kind dispersed in the film. These fibers may consist of sisal, hemp, jute, or the like. Such a sheet material is available commercially and it can be coated with any of the adhesive mixtures above described and then slit into suitable widths for use as sealing or reinforcing tapes. It produces an exceptionally strong product which, when bonded to a carton or the like by an adhesive of the nature above disclosed, makes a very reliable package.

Paper coated with adhesives of this nature are also used frequently as carton liners. Consequently, for convenience these materials, together with sealing and reinforcing tapes, will be hereinafter included in the term "sealing tapes."

While we have herein described preferred embodiments of our invention, it will be evident that some variations are permissible within the spirit and scope of the invention.

Having thus described our invention, what we desire to claim as new is:

1. A sealing tape comprising a strip of sheet material coated with a thermoplastic adhesive composition including an asphalt having a melting point below 200° F. blended with an unmilled reaction product of rubber and a halogen acid of tin in proportions of substantially 1 to 6 parts, by weight, of the latter in 20 parts of the mixture.

2. A sealing tape comprising a strip of sheet material coated with a thermoplastic adhesive composition including an asphalt having a melting point below 200° F. blended with a milled reaction product of rubber and a halogen acid of tin in proportions of substantially 2 to 12 parts, by weight, of the latter in 20 parts of the mixture.

3. A sealing tape comprising a strip of sheet material coated with a thermoplastic adhesive composition composed essentially of an asphalt having a melting point between approximately 160° and 200° F. blended with a sufficient proportion of a reaction product of rubber and a halogen acid of tin to make the coating hard, dry and non-tacky at high atmospheric temperatures but capable of becoming tacky at temperatures below 200° F.

LEWIS DAVIS.
EDWIN C. TUUKKANEN.